(12) United States Patent
Ofer

(10) Patent No.: US 6,189,080 B1
(45) Date of Patent: *Feb. 13, 2001

(54) MINIMUM READ RATE THROUGHPUT IN A DISK CACHE SYSTEM

(75) Inventor: Erez Ofer, Brookline, MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/717,161

(22) Filed: Sep. 20, 1996

(51) Int. Cl.[7] ................................................. G06F 12/00
(52) U.S. Cl. ............................... 711/167; 711/170; 711/4
(58) Field of Search .................................. 395/444, 500, 395/872, 440; 711/117, 113, 118, 167, 170, 4

(56) References Cited

U.S. PATENT DOCUMENTS

| | | | |
|---|---|---|---|
| 5,353,430 | * 10/1994 | Lautzenheiser | 395/444 |
| 5,499,378 | * 3/1996 | McNeill, Jr. et al. | 395/500 |
| 5,561,823 | * 10/1996 | Anderson | 395/872 |
| 5,586,291 | * 12/1996 | Lasker et al. | 395/440 |
| 5,603,062 | * 2/1997 | Sato et al. | 395/872 |
| 5,636,355 | * 6/1997 | Ramakrishnan et al. | 395/440 |

* cited by examiner

Primary Examiner—John W. Cabeca
Assistant Examiner—Fred F. Tzeng
(74) Attorney, Agent, or Firm—Fish & Richardson P.C.

(57) ABSTRACT

A method and apparatus for maintaining a predetermined minimum read rate from a disk drive system, the disk drive system including a read/write cache memory, effect control over the write rate in response to data provided from the disk drive system. A host computer requests write cache utility factor information from the disk drive system. The response to the request provides the host computer with necessary information about the cache memory to enable it to control the write rate to not jeopardize the continuing flow of read data, for example, data for an audio or video decoding application. The host computer periodically samples the utilization of the cache memory and employs one of several methods for controlling the write rate to avoid adversely affecting the read data rate.

23 Claims, 3 Drawing Sheets

STANDARD INQUIRY-RESPONSE

| BYTE | LENGTH | DESCRIPTION |
|---|---|---|
| BYTES 00-35 ARE DEFINED BY SCSI SPEC (STANDARD) | | |
| 0 | 1 | PERIPHERAL QUALIFIER/PERIPHERAL DEV TYPE |
| 1 | 1 | DEVICE TYPE MOD |
| 2 | 1 | ANSI VERSION |
| 3 | 1 | RESPONSE DATA FORMAT |
| 4 | 1 | ADDITIONAL LENGTH |
| 5 | 1 | RESERVED |
| 6 | 1 | RESERVED |
| 7 | 1 | INQ FLAGS |
| 8-15 | 8 | VENDOR ID = |
| 16-31 | 16 | PRODUCT ID =: |
| 32-35 | 4 | CODE REV |
| BYTES 36-103 ARE VENDOR SPECIFIC | | |
| 36-43 | 8 | |
| 44 | 1 | |
| 45 | 1 | |
| 46 | 1 | |
| 47 | 1 | |
| 48 | 1 | |
| 49 | 1 | |
| 50 | 1 | |
| 51 | 1 | |
| 52 | 1 | |
| 53 | 1 | |
| 54 | 1 | |
| 55 | 1 | |
| 56-59 | 4 | |
| 60-63 | 4 | |
| 64-67 | 4 | |
| 96-103 | 8 | |
| 104-113 | 10 | |
| 114-117 | 4 | TOTAL AVAILABLE CACHE SLOTS |
| 118-121 | 4 | WRITE THRESHOLD CACHE SLOTS |
| 122-125 | 4 | CURRENT LEVEL OF WRITE PENDING SLOTS |

FIG. 2

MINIMUM READ RATE THROUGHPUT IN A DISK CACHE SYSTEM

BACKGROUND OF THE INVENTION

The invention relates generally to disk storage systems having a disk cache, and in particular, to such a system in which there is a requirement for maintaining a minimum read rate in order to satisfy an application requirement.

In a typical high speed disk array system, such as that manufactured by EMC Corporation under the name Symmetrix, the disk array system is a cached disk array system which receives, from connected hosts, input/output (I/O) requests through an interconnection channel. In an open-systems environment, a typical channel is a SCSI channel and the I/O requests are composed of read operations and write operations. In the cached disk array, the write operations can all be handled by cache, thus allowing 100% of the write operations to be immediately written to cache and to be destaged later, that is, written from cache to disk. This allows for a very high rate for the write operation. On the other hand, read operations will be serviced either from cache, resulting in a high read response and designated a read "hit," or from the disk which imposes a slower rate of response since a mechanical system is interposed into the read process. This latter operation is designated a read "miss."

When the write rate is high, the method uses more and more of the disk cache to hold the data to be written (the pending write data) before it is destaged to disk. Accordingly, since cache memory for write operations is expended at the expense of the cache area used for read operations, less and less cache memory becomes available for the read operations as the pending write data builds up. The write operations also consume processing cycles of the control unit which also has to handle the read requests.

Typically, this may not be a problem. However in instances where the system is required to maintain a minimum rate of read operations, for example when the stored information on the disk represents digitized audio or digitized video that is being heard or seen in real time, a reduction in the read rate may interrupt the required continuous stream of audio or video information. Accordingly, such processes require at least a predetermined minimum read rate to insure uninterrupted decoding of the stored audio and/or video data.

SUMMARY OF THE INVENTION

The invention relates to a method and apparatus for maintaining a predetermined minimum data read rate from a disk drive system having a read/write cache memory. The method of the invention features the steps of sending, from a host computer to the drive system, a write cache utility factor inquiry; receiving, at the host system, the write cache utility factor information as provided by the disk drive system; determining whether a write rate to the data read/write cache should be changed based upon the utility factor information, and modifying the write rate, if necessary, in response to the determining step.

According to another aspect of the invention, the write cache utility factor information includes at least two of the following: a value representative of the total available cache memory in the disk drive system; a value representative of the maximum write data cache memory permitted to enable the minimum read rate to be maintained; and a value representative of the current write cache memory being used for pending write data.

The method further features determining the write cache utility factor information at a plurality of time instances, determining from this cache utility factor information the rate at which write data destages in the disk drive system and adjusting the write rate in response to the destage rate and the cache utility factor information. In one aspect, the write rate is maintained approximately equal to the destage rate.

In another aspect of the invention, the method features modifying the write rate in response to the unused write cache availability as determined from the cache utility factor information.

In a preferred aspect of the invention, the sending of the write cache utility factor features sending a SCSI Inquiry command to the disk drive system from the host computer and the receiving step features receiving a SCSI response to the Inquiry command that contains the write cache utility factor information.

The apparatus of the invention features a host system having a host system interface for requesting write cache utility factor information from the disk drive system and the disk drive system has a memory system interface for receiving the host factor request, and a controller connected to the memory system interface for processing the request and for generating a response to the request. The response includes the write cache utility factor information. The host further has a write rate control element for controlling the write rate in response to the drive system controller response.

This system provides advantageous operation where a minimum read rate must be maintained, and where at the same time, a mechanism is provided to service write operations consistent with the minimum read rate requirement. This system can automatically adjust to different cache sizes and operating parameters, and additional hardware units need not be added where, for example, the SCSI Inquiry command is used to acquire certain information about the cache usage, and the disk drive system has been configured to respond to that command.

BRIEF DESCRIPTION OF THE DRAWING

Other objects, features, and advantages of the invention will be apparent from the following description taken together with the drawings in which:

FIG. 2 is a typical inquiry page response showing the elements of the cache utilization in accordance with a preferred embodiment of the invention;

DESCRIPTION OF PRESENTLY PREFERRED EMBODIMENTS

Figure 1:
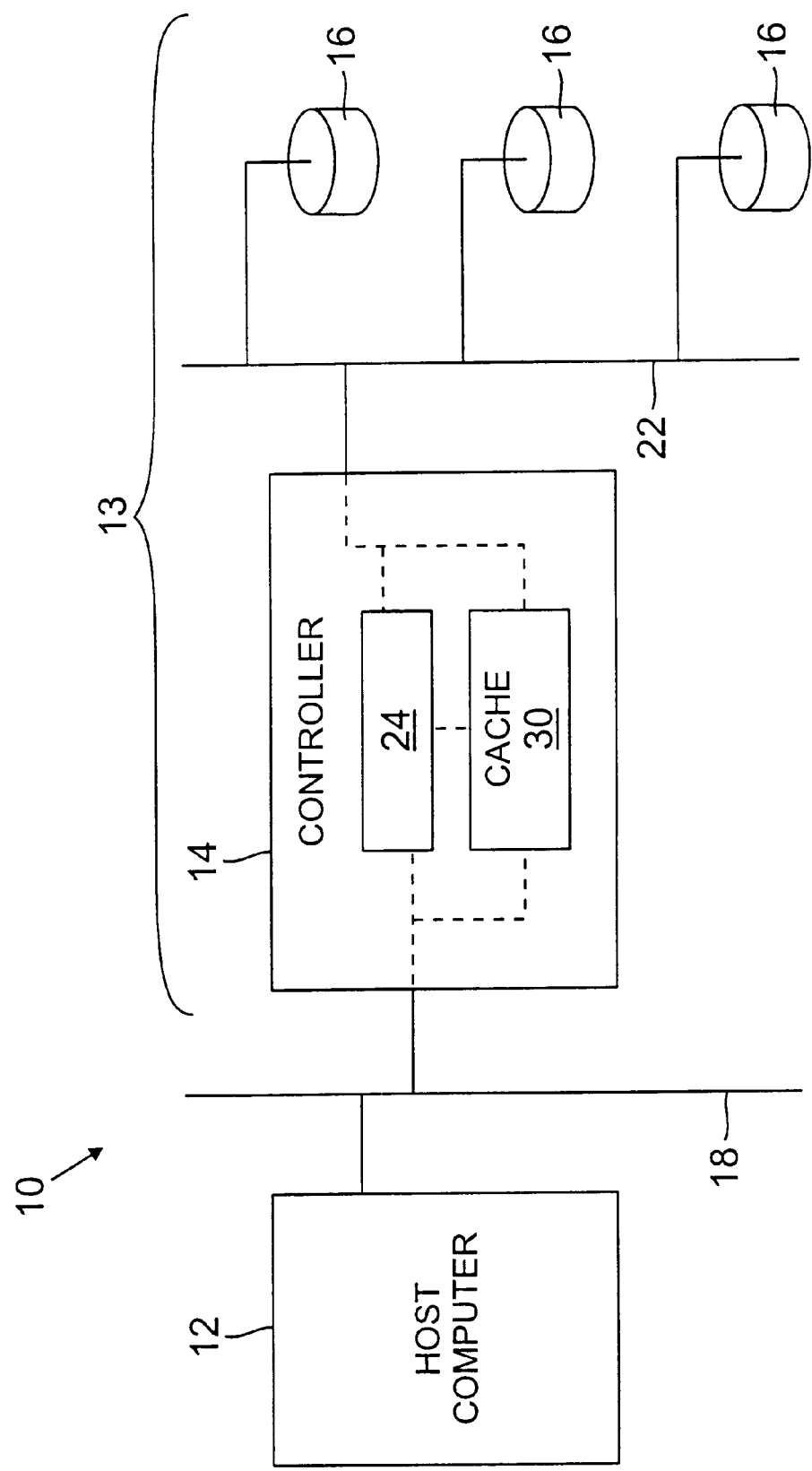
FIG. 1 is a block diagram of a system in accordance with the invention.

Referring to FIG. 1, a computer system 10 includes a host computer 12, a disk drive system 13 including a controller system 14 and a plurality of disk drives 16. The host computer 12 and the controller 14 communicate over a bus 18. The protocol used by the host computer 12 and controller 14 is preferably a SCSI protocol which is well defined in the field. The controller 14 operates and controls the disk drive units 16 over any of a number of buses 22 as is well known in the art.

The disk drive units are typically, in a modern system, large drives capable of storing, for example, four gigabytes each. With such large capacities, these drives will often contain audio and/or video digital information such as that used in voice messaging systems, music playback systems, and video on demand systems. Each of these systems, however, requires a continuous stream of information, at a minimum data rate, in order to decode and provide continuous, uninterrupted audio and/or video information to a user. Accordingly, the disk drive units 16 must be capable of being read at a rate sufficient to provide that continuous data for decoding.

In an operation dedicated only to reading the disks, there is more than ample capacity in a modern system to provide information at a data rate required by such continuous need systems. Typical data rates can be, for example, 4 megabytes per second. A typical disk drive system can provide information at up to, for example, 6 megabytes per second.

In a high capacity, high throughput system, however, the disk drive controller typically employs a controller element 24 and a large cache memory 30 which serves both read and write functions. Cache memories are well known in the field and enable portions of the disk drive data to be read and stored in it as a block so that read requests need not be made for each byte of data needed from the disk drives. Similarly, when the host computer writes data to the disk drive, the cache memory can provide a "hit" each time a write request is made so that the write data is stored in the cache memory until a time is available for the controller 14 to write the cached data, as a group, to the disk drive elements. Accordingly, the disk controller cache can contain a significant quantity of pending (to be destaged) write data. When this occurs, however, it occurs at the expense of cache space which would otherwise be used in connection with the disk drive read cache operation. Accordingly, if the disk drive read operation is to continue at a minimum specified rate the disk drive write cache must be controlled so that it does not exceed a certain maximum size (corresponding to a minimum read cache requirement) in order to maintain the read rate.

In accordance with the invention, the host computer application is responsible for controlling the rate of writes destined for the disk drive system in order to maintain the write cache level at or below some fixed value. While several methods can be employed according to the invention to effect this operation, two preferred embodiments are described hereinafter.

Before describing the detailed operation of the system, some description of the mechanism for communicating between host and controller is appropriate. Since many high capacity, high volume fast controllers currently exist, it is desirable to provide a host communications mechanism which does not require modification of at least the host system hardware. In this respect, therefore, for a SCSI interconnection, the host system application uses the SCSI Inquiry command to obtain the needed information and provide it to the application. Typically, the SCSI Inquiry command is used to determine the configuration of the SCSI device, that is, device type, vendor identification, model number, and other useful information. The SCSI Inquiry command will return to the host up to 256 bytes of information, and thirty-six of those bytes are defined by the SCSI standard (see FIG. 2) and compliance to the standard is mandatory. Forty other bytes are reserved for future standards definitions.

The rest of the bytes returned to the host are defined by the standard as being "Vendor Unique." Thus a manufacturer can use them to convey additional information to a requesting host. It is a portion of these bytes which are used to return information (write cache utility factor information) to the host, describing the volume of pending write data waiting to be destaged from the cache 30 of controller 14. In a preferred embodiment of the invention, twelve bytes are allocated to the write cache utility factor information that is returned in response to the SCSI Inquiry command to determine whether to enable the host to "throttle" the write content or write rate to the disk. Specifically, the information which is returned includes the total number of cache slots available at controller 14 (each cache slot, in the illustrated embodiment, is 32K bytes in size), a write threshold cache slot count corresponding to the maximum number of write slots which can be allocated in accordance with a desired minimum read rate; and the current level of cache slots occupied by write data that is pending destaging from the cache to the disk drive(s). Referring to FIG. 2, this information is illustrated as being provided in bytes 114–125, with four bytes being allocated to each "piece" of information. Accordingly, a maximum number of bytes of cache memory in this configuration is $2^{47}$ bytes.

As illustrated in FIG. 2, substantial additional space is available for vendor specific information.

Figure 3:
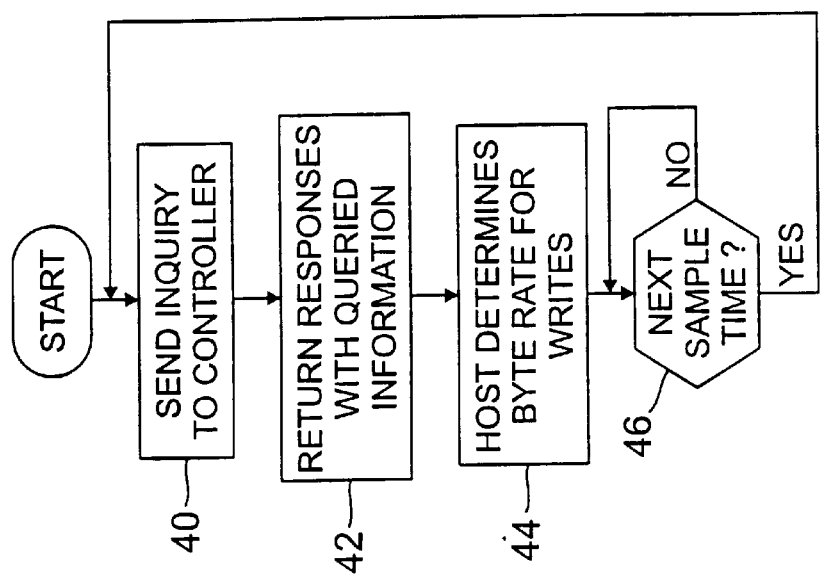
FIG. 3 is a flow chart of the operation of the system, in accordance with one embodiment of the invention.

With this information available to the host, and referring now to FIG. 3, in a first embodiment of the invention the host computer first sends the SCSI Inquiry command, at 40, to the controller 14. The controller, at 42, returns a 256 byte response (illustrated in FIG. 2) which provides the data sought at bytes 114–125. The host computer then determines, at 44, in accordance with this embodiment, how many additional writes can be made by subtracting the number of writes pending from the threshold number. In this embodiment, therefore, it is not necessary to know the entire cache size.

Once that number of writes is made, no additional writes will be permitted. (Alternatively, the write rate at the host can be modified as necessary.) However, the host computer, before reaching that limit, at 46, sends another Inquiry command to the controller 14, determines again the amount of write space which is available, and accordingly can adjust a write rate so that the maximum allocated write space is not exceeded. In this manner, the host computer determines, for the time between its Inquiry commands, a write rate that prevents writing beyond the maximum size of cache memory allocated to pending writes.

Thus, expressed in a quantitative way, the host computer inquires at times $T_1, T_2, T_3 \ldots$ what the cache utilization factor is. It receives in response, at each time, in this illustrated embodiment, the cache size S, the volume of cache occupied by the pending write data, P, and the maximum available write size for pending writes within the cache, W. If the write rate from the host to the disk drive is R bytes per second, then, for the time interval from $T_i$ to $T_{i+1}$:

$$R < (W-P)/(T_{i+1} - T_i)$$

to ensure that the write space does not overflow. Alternatively, the total number of bytes written in the interval from $T_i$ to $T_{i+1}$ is limited to less than W–P.

In other embodiments of the invention, the write rate may be reduced from its standard value, for an interval, only if the available write cache is less than a predetermined threshold value, that is, if the available write cache is insufficient to receive all the write data which might be sent at the standard rate in the interval.

Figure 4:
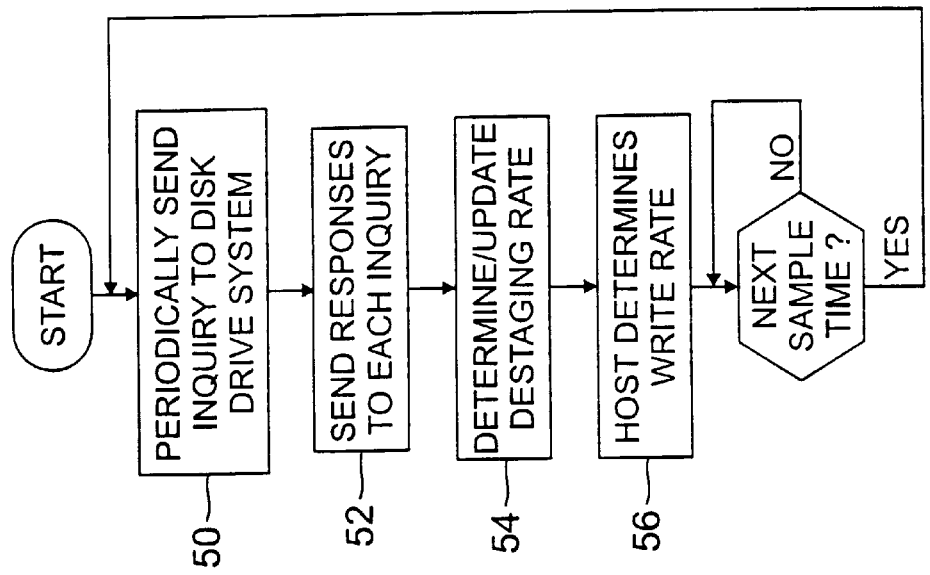
FIG. 4 is a flow chart showing operation of the system in accordance with a second embodiment of the invention.

Referring now to FIG. 4, in another application, a host computer 12 will request the write cache utility factor information, and hence sample the information periodically, by sending Inquiry commands at preferably regular time intervals to the drive system. This is indicated at 50. While the time intervals are preferably of the same size, they need not be. From the responses, received at 52, the host application can determine, at 54, the rate at which write data are being destaged in the disk array (taking into account the knowledge of how much more write data are added to the pending write data in each interval of time). With the knowledge of how much write space in the cache will become available during a time interval, and further with the knowledge of how much additional space, if any, there is in the cache memory allocated to pending write operations, the rate of writes from a write application can be set, at 56, to no more than that rate which will not exceed the amount of cache memory allocated to the write data. In this manner, a higher write rate can be achieved while maintaining the minimum of required read rate.

In this example, therefore, since the destage rate is to be taken into account, one first must calculate the destage rate at 54, based on past experience. A conservative approach would be to use the lowest destage rate $D_L$ for the past ten time intervals. The expected destage rate, $D$, for an interval is calculated as: $D=(P_b+TW-P_e)\Delta t$. This takes into account the number of pending writes, $P_b$, as of the beginning of the interval, the total number of writes, TW, during the interval, and the number of pending writes, $P_e$ at the end of the interval. With this information for each past interval, the write rate, R, for the present interval (defined as the interval beginning at time $T_i$ and ending at time $T_{i+1}$ is required to be less than that which would overfill the space (W−P) available at time $T_i$ in the write pending portion of the cache memory, and is calculated as follows:

$$R<(W-P)/(T_{i-1}-T_i)+D_L$$

where $D_L$ is the minimum value of D over the last ten time intervals. Other approaches to determining an acceptable destaging rate will be apparent to those practiced in the field and can include either a longer of shorter view of the destaging process or an averaging process. In other embodiments, the write rate can simply be limited to be less than the destage rate, D.

Other methods of operation will be apparent to those familiar with the field. In particular, other mechanisms can be employed for transmitting the write cache status from the disk controller 14 to the host computer 12, and other information, can be added to or subtracted from the write cache utilization factor information described in these preferred embodiments of the invention. For example, the total cache size need not be transmitted so long as the maximum write cache size and the write data pending to be destaged are made known to the host computer. In other embodiments, the total cache size and the number of pending writes may be the only information provided to the host computer, the host computer being provided with the capability to determine (or estimate) a maximum write cache size from that information and the information known to it regarding the minimum read rate. Indeed, the minimum read rate may vary from application to application, information about which is used to change the maximum write cache size and enable the system to dynamically adapt to varying application programs running at the host computer in order to maximize use of, and throughput for, the system. Further the disk drive system can perform calculations so that the utilization factor sent to the host is the write rate itself.

In fact, in a particular embodiment of the invention, the disk drive system itself, using the utilization factor information can effect control over the write operations to ensure a minimum data read rate required by a particular host application. Thus, the controller can, for example, effectively reject or otherwise prevent a write request from being accepted and carried out, if the information available to it regarding the utilization of the cache memory for storing pending write data indicates that the processing of the write request will prevent the disk drive system from maintaining the minimum read rate required by a specific application. In this instance, the disk drive system, and in particular the disk drive controller, will perform the steps otherwise performed at the host computer and will act to throttle write requests coming to it from the host computers, where necessary.

Additions, deletions, and other modifications of the invention will be apparent to those practiced in the field and are within the scope of the following claims.

What is claimed is:

1. A method for maintaining a predetermined minimum data read rate to a host computer from a disk drive system having an integral data read/write cache memory through which read and write data pass, wherein at different particular time instants, a same portion of the cache memory can be used for storing read and write data, comprising the steps of
   sending from the host computer a write cache utility factor inquiry,
   receiving, at the host system, write cache utility factor information,
   determining whether a write rate to the data read/write cache should be changed based on said utility factor information for the read/write cache memory, and
   modifying, if necessary in response to said determination step, the write rate to the data cache.

2. The method of claim 1 wherein
   said determining step comprises the step of determining whether the write rate should be decreased to maintain said minimum data read rate, and
   said modifying step comprises the step of decreasing said write rate, if necessary, in response to said determination step.

3. The method of claim 1 wherein said write cache utility factor information further comprises at least two of: a value representative of the total available cache memory, a value representative of a maximum write data cache memory permitted to enable the minimum read rate to be maintained, and a value representative of the current write cache memory being used for pending write data.

4. The method of claim 3 further comprising the step of
   reducing said write rate whenever an available write cache is less than a predetermined threshold value, where available write cache equals the maximum write data cache memory minus the current pending data write cache memory.

5. The method of claim 3 further comprising the steps of
   determining the write cache utility factor information at a plurality of time instances,
   determining the rate of write data destaging in the disk drive system from said cache utility factor information, and
   adjusting the write rate in response to the write destage rate and the cache utility factor information.

6. The method of claim 5 wherein said modifying step comprises the step of
   maintaining said write rate approximately equal to said write destage rate.

7. The method of claim 5 wherein said modifying step comprises the step of
   modifying said write rate in response to an unused write cache availability determined from said cache utility factor information.

8. The method of claim 1 wherein said determining and modifying steps comprise the steps of
   determining an available write data cache, and
   modifying the write rate so that said available write cache is not overfilled prior to said next sending step.

9. The method of claim 1 wherein said sending step comprises
   sending a SCSI Inquiry command to said disk drive system from said host computer, and
   said receiving step comprises
   receiving a SCSI response to said Inquiry command that contains said cache utility factor information.

10. An apparatus for maintaining a predetermined minimum data read rate to a host system in a disk drive system having an integral data read/write cache memory through which read and write data pass, wherein, at different time instants, a same portion of the cache memory can contain read and write data, comprising the host system having a host system interface for requesting write cache utility factor information from the disk drive system, said disk drive system having a memory system interface for receiving said host factor request, and a controller connected to the memory system interface for processing said host factor request and for generating a response to said request based upon the read/write cache memory, and a write rate control at the host system for controlling the write rate to the data cache in response to said drive system controller response.

11. The apparatus of claim 10 wherein said response comprises a value representative of at least two of
(i) the total available cache memory,
(ii) a maximum write data cache memory permitted to enable the minimum read data rate to be maintained, and
(iii) the current write cache memory being used for pending write data.

12. The apparatus of claim 11 wherein
said write rate control modifies the rate at which write commands are sent to said disk drive system in response to a received response.

13. The apparatus of claim 10 wherein
said host system interface periodically sends said request to said disk drive system, and
said host computer write rate control determines a destage rate of pending write data in said cache memory and adjusts the write rate at least in response to said destage rate.

14. The apparatus of claim 10 wherein said host system interface and said memory system interface are each SCSI interface units.

15. The apparatus of claim 10 further wherein said controller sends said response to said host system using the memory interface and the host interface.

16. A disk drive system for enabling the maintenance of a minimum read rate in a disk drive system comprising an integral data read/write cache memory through which read and write data pass wherein at different time instants, a same portion of the cache memory can contain read and write data, a memory system interface for receiving from a host computer, a host utility factor request, and a controller, connected to the memory system interface for processing said host utility factor request and for generating a response to said request, said response including a value representative of at least two of:
(i) the total available cache memory,
(ii) a maximum write data cache memory permitted to enable the minimum read data rate to be maintained, and
(iii) the current write cache memory being used for pending write data.

17. The apparatus of claim 16 wherein said system further comprises means for inhibiting a response to a write request from a host computer if said write request will prevent said disk drive system from processing read requests at a minimum predetermined read rate.

18. A disk drive system for maintaining a minimum data read rate comprising an integral data read/write cache memory through which read and write data pass, wherein, at different time instants, a same portion of the cache memory can contain read and write data, a disk drive controller, a memory system interface for receiving read and write requests from a host computer, the controller being connected to the memory system interface and to the read/write cache memory, for handling read and write requests to a disk drive storage, said disk drive controller being responsive to the utilization of the read/write cache memory for storing pending write data for preventing a response from the disk drive system to a write request from a host computer in order to maintain said minimum read rate from the disk drive system to a requesting host computer.

19. The system of claim 18 wherein said controller has means for deciding when to prevent a response to a write request based upon a value representative of at least two of
(i) the total available cache memory,
(ii) a maximum write data cache memory permitted to enable the minimum read rate to be maintained, and
(iii) the current write cache memory being used for pending write data.

20. The disk drive system of claim 18 further comprising said controller determining a destage rate of pending write data in said cache memory and adjusting the rate at which write requests are fulfilled, at least in response to said destage rate.

21. A method for maintaining a predetermined minimum data read rate from a disk drive system having in integrated data read/write cache memory through which read and write data pass, and wherein, at different time intervals, a same portion of the cache memory can be used for storing read and write data, comprising the steps of determining a write cache utility factor information for said read/write cache memory, determining whether fulfilling a further write request from a host computer will cause a read data flow to diminish below said minimum data read rate, and rejecting write requests from a requesting host if accepting said write request will cause said read data rate to drop below said minimum read data rate.

22. The method of claim 21 wherein said write cache utility factor information comprises at least two of:

a value representative of the total available cache memory, a value representative of a maximum write data cache memory permitted to enable the minimum read data rate to be maintained, and a value representative of the current write cache memory being used for pending write data.

23. The method of claim 21 further comprising the steps of determining the write cache utility factor information at a plurality of time instances, determining the rate of write data destaging in the disk drive system from the cache utility factor information, and adjusting the rate at which write data requests are fulfilled in response to the write destage rate and the cache utility factor information.

* * * * *